(12) United States Patent
Endo et al.

(10) Patent No.: US 7,031,882 B2
(45) Date of Patent: Apr. 18, 2006

(54) INFORMATION COLLECTING APPARATUS AND INFORMATION COLLECTING/ANALYZING SYSTEM

(75) Inventors: Keiji Endo, Ebina (JP); Kouichi Sato, Ebina (JP)

(73) Assignee: Fuji Xerox Engineering Co., Ltd., Ebina (JP)

( * ) Notice: Subject to any disclaimer, the term of this patent is extended or adjusted under 35 U.S.C. 154(b) by 0 days.

(21) Appl. No.: 10/756,250

(22) Filed: Jan. 14, 2004

(65) Prior Publication Data

US 2004/0204923 A1    Oct. 14, 2004

(30) Foreign Application Priority Data

Jan. 16, 2003    (JP)    ............................... 2003-007832

(51) Int. Cl.
*G06F 11/00* (2006.01)

(52) U.S. Cl. ........................................ 702/183; 700/26

(58) Field of Classification Search ................ 702/122, 702/182–185, 189, 33–35, 59, 188; 700/28–30, 700/47–49, 1, 9, 12, 26, 108, 110; 714/25
See application file for complete search history.

(56) References Cited

U.S. PATENT DOCUMENTS 6,799,128 B1 *    9/2004    Duff et al. ..................... 702/70
6,853,920 B1 *    2/2005    Hsiung et al. ................. 702/1

* cited by examiner

*Primary Examiner*—Edward Raymond
(74) *Attorney, Agent, or Firm*—Bacon & Thomas, PLLC

(57) ABSTRACT

An information collecting apparatus and collecting/analyzing system, including an input unit for sampling digital signals input from each part of an object to be measured, a transfer unit for transferring the digital signals via a communication interface to a host computer in substantially real time, and a control unit for controlling the input unit and transfer unit; and a host computer, including a signal processing unit for processing digital signals transferred from the information collecting apparatus, a storage device for storing processed digital signals in substantially real time, display units for displaying various types of images based on digital signals stored in the storage device, and a control unit for controlling the signal processing unit, storage device and display units.

16 Claims, 2 Drawing Sheets

INFORMATION COLLECTING APPARATUS AND INFORMATION COLLECTING/ANALYZING SYSTEM

BACKGROUND OF THE INVENTION

1. Field of the Invention

The present invention relates to an information collecting apparatus and an information collecting/analyzing system for measuring signals from various parts and performing logic analysis and the like in order to develop, debug and maintain electronic circuits in various types of electronic machines and the like.

2. Description of the Related Art

In the prior art, this type of logic analyzer, by inputting digital signals corresponding to various parts of an electronic circuit to be measured as logic signals, reads these logic signals at set trigger points, stores them in memory, and after measuring is complete, reads out the logic signals stored in memory and displays various images on a display unit based on the read out logic signals.

A high speed volatile memory is used as a memory for storing the logic signals. Since this high speed volatile memory is relatively expensive, the capacity of the memory mounted in the logic analyzer is somewhat limited.

Consequently, although a high speed logic signal of, for example, 100 MHz or more can be acquired, long term measurement, i.e. reading a large amount of logic signal data, is difficult due to limited memory capacity. As a result, by utilizing the trigger function as described above, short term logic signals are read at required timings and stored in memory.

Meanwhile, there are also applications in which medium to low speed signals of, for example, 1 MHz or less are required to be measured over long periods of one minute or more. In such cases, in order to measure a 16-channel logic signal over 10 minutes at a sampling frequency of 1 MHz, for example, and to read and store the logic signal in memory, a memory capacity of 1.2 GB is required. Although it is possible to realize such a large memory capacity, the cost of memory increases significantly, therefore logic analyzers in which this type of large capacity memory is installed have not been marketed.

Also, in Japanese Patent Application Laid-open Pub. No. Hei 4-194688, for example, a logic analyzer that is provided with an external memory device in place of the above-described memory is disclosed. However, since the external memory device has the same function as the above-described memory and is dedicated to the relevant logic analyzer, there is no significant difference between it and the above-described memory.

In recent years, logic analyzer devices without display units have been marketed on the premise of being used in connection with a host computer such as a personal computer or the like.

Such logic analyzer devices are constructed as shown in the example of FIG. 2.

That is, in FIG. 2, the logic analyzer device 1 is connected to a personal computer 2, thereby forming overall a logic analyzer system.

The logic analyzer device 1 comprises an input unit 3, a storage device 4, a transfer unit 5 and a control unit 6.

The input unit 3 is supplied with a logic signal acquired by probes (not shown) from various parts of an object to be measured 7, in this case an electronic machine, and after the logic signal is shaped by level conversion or the like, it is sampled at a set sampling frequency and output to the storage device 4.

The storage device 4 is constructed from a volatile memory and has a capacity of a maximum of several megabytes, for example, and stores the logic signal input from the input unit 3.

The transfer unit 5 is connected to the personal computer 2 via a communication interface 8, and after measurement by the input unit 3 is complete, reads the logic signal stored in the storage device 4 and sends it to the personal computer 2 via the communication interface 8.

The control unit 6 controls the input unit 3, storage device 4 and transfer unit 5 so that the logic signal is read from the object to be measured 7 at a set trigger timing, stored in the storage device 4, read from the storage device 4 after measurement is completed, and transmitted to the personal computer 2 from the transfer unit 5.

The personal computer 2 includes a transfer unit 2a, a signal processing unit 2b, a storage device 2c, a display unit 2d and a control unit 2e, and forms a logic analyzer system in cooperation with the logic analyzer device 1.

The transfer unit 2a receives a logic signal from the transfer unit 5 of the logic analyzer device 1 via a USB 1.1 specification communication interface 8 or the like, and sends it to the signal processing unit 2b.

The signal processing unit 2b converts the logic signal from the transfer unit 2a to various types of display signals by storing it in the storage device 2c and performing the appropriate processing based on the logic signal, then outputs the display signals to the display unit 2d.

In the logic analyzer system using a logic analyzer device 1 and personal computer 2 in this type of structure, digital signals at each portion of the electronic circuit of an object to be measured 7 are input to the input unit 3 of the logic analyzer device 1 as logic signals, whereby the input unit 3 acquires these logic signals at set trigger points and stores them in the storage device 4, and, after measuring is complete, the logic signals stored in the storage device 4 are read out and output to the personal computer 2 from the transfer unit 5 via the communication interface 8.

As a result, the personal computer 2 receives the logic signals transferred from the logic analyzer device 1 by means of the transfer unit 2a, and signal processing is performed by the signal processing unit 2b. The personal computer 2 then stores the data storage processed logic signals in the storage device 2c and outputs various types of display control processed logic signals to the display unit 2d, and various types of displays are executed by the display unit 2d.

However, in the logic analyzer device 1 and logic analyzer system constructed in this manner, the built-in storage device is restricted from storing measured logic signal data due to its storage capacity in the same way as the logic analyzer device described above, and therefore, performing measurements over long periods is troublesome even when measuring medium to low speed logic signals.

Consequently, when performing measurement of logic signals over very long periods of time, the sampling frequency is greatly reduced, and measurement precision must be sacrificed in order to measure very long periods.

Further, when measuring serial signals of an electronic circuit to be measured, as well as the logical analyzer device, a protocol analyzer must be provided to measure the serial signals, and matching the time axis and standard time of a serial signal measured by the protocol analyzer to a logic signal measured by the logic analyzer device is very difficult.

SUMMARY OF THE INVENTION

It is therefore an object of the present invention, in light of the above, to provide an information collecting apparatus and information collecting/analyzing system that enable measurement over very long periods, without incorporating a large capacity storage device, by using an external host computer.

Another object of the present invention is to provide an information collecting apparatus and information collecting/analyzing system that enable measurement of, as well as logic signals, serial signals of an object to be measured, with time axes and standard times matched with the logic signals.

In order to achieve the above objects, according to a first aspect of the present invention there is provided an information collecting apparatus comprising an input unit for inputting digital signals from each part of an object to be measured, for sampling the digital signals; a transfer unit for transferring digital signals from the input unit via a communication interface to a host computer which performs signal processing of the digital signals, the host computer storing the processed digital signals in a storage device and displaying various images based on corresponding digital signals; and a control unit for controlling the input unit and transfer unit, wherein the transfer unit transfers digital signals from the input unit in substantially real time.

It is preferred that the information collecting apparatus be a logic analyzer device, with logic signals from each part of an object to be measured being input to the input unit, and that the transfer unit transfer logic signals from the input unit via the communication interface or via a peripheral interface to the host computer.

Preferably, the information collecting apparatus further comprises a buffer for compressing and temporarily storing digital signals or logic signals from the input unit.

The control unit may initiate transfer of digital signals or logic signals by means of the transfer unit, based on a transfer instruction from the host computer.

The communication interface may be a high speed interface.

Power is preferably supplied to the information collecting apparatus from the host computer via a power supply line of the communication interface.

It is preferred that when an error occurs in the input unit or in the transfer unit, the control unit allow the transfer unit to output an error occurrence and time as error data to the host computer.

It is preferred that the input unit input serial signals from each part of an object to be measured, the input unit synchronizing the serial signals with digital signals or logic signals, for outputting, and that the transfer unit transfer the serial signals to the host computer together with the digital signals or logic signals.

According to the first aspect described above, the information collecting apparatus samples the digital signals input to the input unit, and transfers them from the transfer unit to the host computer in substantially real time, via a communication interface. Then, the host computer signal processes the digital signals transferred from the information collecting apparatus, thereby storing them in the storage device in substantially real time, and performs various displays based on the corresponding digital signals.

As a result, because temporary storage in a storage device built into the information collecting apparatus is unnecessary, measurement of digital signals over extremely long periods of time becomes possible without being restricted by the storage capacity of the storage device of the information collecting apparatus.

Since the measured digital signals or logic signals are transferred to the host computer in substantially real time, after completion of measurement the information collecting apparatus does not need to read the digital signals stored in the storage device and transfer them to the host computer. Also, because the host computer signal can successively process the digital signals transferred from the information collecting apparatus during measurement, the time until completion of signal processing in the host computer can be shortened.

Further, the digital signals, after being transferred to the host computer, are stored in a storage device provided in the host computer. Since, in recent years, large capacity memory devices of several tens of gigabytes, for example, are provided in host computers, even digital signals measured over extremely long periods of time can be reliably stored using such large capacity storage devices.

Also, because a storage device for storing the digital signals is not necessary at the information collecting apparatus end, its overall structure can be simplified and compacted, further reducing its cost.

Where the above information collecting apparatus is a logic analyzer device, and logic signals at each part of an object to be measured are input to the above input unit and the transfer unit transfers the logic signals from the input unit to a host computer via a communication interface, logic signals measured over an extremely long period of time can be transferred to the host computer and stored in its storage device in substantially real time.

Further, where a buffer for primary compression and temporary storage of the digital signal or logic signal from the above input unit is provided, by subjecting the digital signal or logic signal from the input unit to primary compression and temporarily storing it in the buffer, with the communication interface having the same communication capacity, not only can the sampling frequency of the input unit be increased and the measuring precision improved, but communication interface traffic (the amount of transfer data) can also be decreased.

In that instance, by performing primary compression in the buffer, the compression ratio can be set low compared to the case where the signals are stored in the storage device, therefore there is no delay in the processing speed.

Where the above control unit, based on based on a transfer instruction from the host computer, begins transfer of the digital signal or logic signal by the transfer unit, sampling of the digital signal or logic signal is initiated with the transfer instruction from the host computer as a trigger, and digitals signal or logic signals can be transferred from the necessary trigger points to the host computer.

Where the above communication interface is a high speed interface, by increasing the transfer speed by means of, for example, an IEEE1394 or USB 2.0 high speed interface, the sampling frequency of the input unit can be increased even further, and medium to low speed sampling of, for example, 10 MHz or lower can be performed.

Where power is supplied to the information collecting apparatus from the host computer via the power line of the above communication interface, the information collecting apparatus, by utilizing the power line in a USB 2.0 specification communication interface, for example, can be supplied with power from the host computer. As a result, it can be used in locations where an external power supply cannot be used, by using a notebook type personal computer, for example, as the host computer.

Where the above control unit, when an error occurs in the input unit or the transfer unit, outputs from the transfer unit the error occurrence and time as error data to the host computer, the error time can be acquired on the host computer side based on the error data, therefore it can correctly revise the time axis of the digital signal or logic signal after an error occurs. As a result, when an error occurs, by including the error time in the error data the time axis can be correctly revised based on this error time, disturbances in the time axis can be removed, and reliability can be improved even further.

Where the above input unit receives serial signals from each part of the object to be measured and synchronizes and outputs these serial signals with digital signals or logic signals, and the transfer unit transfers these serial signals to the host computer together with the digital signals or logic signals, when measuring the serial signals of the object to be measured, measurement of the serial signals and digital signals or logic signals can be performed with only the information collecting apparatus and without the necessity of providing a separate protocol analyzer, and the serial signals and digital signals or logic signals can be measured and displayed on the same time axis.

In order to attain the above objects, according to a second aspect of the present invention there is provided an information collecting/analyzing system, comprising an information collecting apparatus, including an input unit for inputting digital signals from each part of an object to be measured, for sampling the digital signals, a transfer unit for transferring digital signals from the input unit via a communication interface to a host computer, and a control unit for controlling the input unit and the transfer unit; and a host computer, including a signal processing unit for processing digital signals transferred from the information collecting apparatus, a storage device for storing digital signals from the signal processing unit, a display unit for displaying various types of images based on the digital signals processed by the signal processing unit or on the digital signals stored in the storage device, and a control unit for controlling the signal processing unit, storage device and display unit, wherein the transfer unit of the information collecting apparatus transfers digital signals from the input unit in substantially real time to the host computer, and wherein the storage device of the host computer stores logic signals transferred from the information collecting apparatus in substantially real time.

It is preferred that the information collecting apparatus be a logic analyzer device, with logic signals from each part of an object to be measured being input to the input unit of the information collecting apparatus, and that the transfer unit of the information collecting apparatus transfer logic signals from the input unit via the communication interface to the host computer.

It is preferred that the information collecting apparatus further comprise a buffer for primarily compressing and temporarily storing digital signals or logic signals from the input unit, and that the signal processing unit of the host computer secondarily compress the processed digital signals and store them in the storage device.

Preferably, the control unit of the information collecting apparatus initiates transfer of digital signals or logic signals by means of the transfer unit, based on a transfer instruction from the control unit of the host computer.

The communication interface may be a high speed interface.

Power is preferably supplied to the information collecting apparatus from the host computer via a power supply line of the communication interface.

It is preferred that when an error occurs in the input unit or in the transfer unit, the control unit of the information collecting apparatus allow the transfer unit to output an error occurrence and time as error data to the host computer.

It is preferred that the input unit of the information collecting apparatus input serial signals from each part of an object to be measured, the input unit synchronizing the serial signals with the digital signals or logic signals, for output, that the transfer unit transfer the serial signals to the host computer together with the digital signals or logic signals, and that the signal processing unit of the host computer process the digital signals or logic signals and the serial signals, for storing them in the storage device.

According to the second aspect described above, the information collecting apparatus of the information collecting/analyzing system samples the digital signals input to the input unit, and transfers them from the transfer unit to the host computer in substantially real time, via a communication interface.

Then, the host computer of the information collecting/analyzing system signal processes the digital signals transferred from the information collecting apparatus, thereby storing them in the storage device in substantially real time, and performs various displays based on the corresponding digital signals.

As a result, because temporary storage of digital signals in a storage device built into the information collecting apparatus is unnecessary, they are not restricted by the storage capacity of the storage device of the information collecting apparatus, and can be stored in a large capacity memory device of several tens of gigabytes, for example, provided in the host computer, therefore even digital signals measured over extremely long periods of time can be reliably stored using this large capacity storage device and measurement of digital signals over extremely long periods of time is possible.

Also, because a storage device for storing the digital signals is not necessary at the information collecting apparatus end, its overall structure can be simplified and compacted, further reducing its cost.

Since the measured digital signals or logic signals are transferred to the host computer in substantially real time, after completion of measurement the information collecting apparatus does not need to road the digital signals stored in the storage device and transfer them to the host computer. Also, because the host computer signal can successively process the digital signals transferred from the information collecting apparatus during measurement, the time until completion of signal processing in the host computer can be shortened.

Where the above information collecting apparatus is a logic analyzer device, and logic signals at each part of an object to be measured are input to the input unit of the above information collecting apparatus and the transfer unit of the above information collecting apparatus transfers the logic signals from the input unit to a host computer via a communication interface, logic signals measured over an extremely long period of time can be transferred to the host computer and stored in its storage device in substantially real time.

Further, where the above information collecting apparatus is provided with a buffer for primary compression and temporary storage of the digital signal or logic signal from the above input unit, by subjecting the digital signal or logic signal from the input unit to primary compression and temporarily storing it in the buffer, with the communication interface having the same communication capacity, not only can the sampling frequency of the input unit be increased and the measuring precision improved, but transfer can also be suitably performed according to the communication interface traffic state.

In that instance, by performing primary compression in the buffer, the compression ratio can be set low compared to the case where the signals are stored in the storage device, therefore there is no delay in the processing speed, and by performing secondary compression with the signal processing unit of the host computer, the digital signals are stored in the storage device at the optimum compression rate for storage.

Where the above control unit of the information collecting apparatus, based on based on a transfer instruction from the control unit of the host computer, begins transfer of the digital signal or logic signal by the transfer unit, sampling of the digital signal or logic signal is initiated with the transfer instruction from the host computer as a trigger, and digitals signal or logic signals can be transferred from the necessary trigger points to the host computer.

Where the above communication interface is a high speed interface, by increasing the transfer speed by means of, for example, an IEEE1394 or USB 2.0 high speed interface, the sampling frequency of the input unit can be increased even further, and medium to low speed sampling of, for example, 10 MHz or lower can be performed.

Where power is supplied to the information collecting apparatus from the host computer via the power line of the above communication interface, the information collecting apparatus, by utilizing the power line in a USB 2.0 specification communication interface, for example, can be supplied with power from the host computer. As a result, it can be used in locations where an external power supply cannot be used, by using a notebook type personal computer, for example, as the host computer.

Where the above control unit of the information collecting apparatus, when an error occurs in the input unit or the transfer unit, outputs from the transfer unit the error occurrence and time as error data to the host computer, the error time can be acquired on the host computer side based on the error data, therefore it can correctly revise the time axis of the digital signal or logic signal after an error occurs. As a result, when an error occurs, by including the error time in the error data the time axis can be correctly revised based on this error time, disturbances in the time axis can be removed, and reliability can be improved even further.

Where the above input unit of the information collecting apparatus receives serial signals from each part of the object to be measured and synchronizes and outputs these serial signals with digital signals or logic signals, the transfer unit transfers these serial signals to the host computer together with the digital signals or logic signals, and the signal processing unit of the host computer performs signal processing on the serial signals and digital signals or logic signals, stores them in the storage devices, and displays them on the display unit, when measuring the serial signals of the object to be measured, measurement of the serial signals and digital signals or logic signals can be performed with only the information collecting apparatus and without the necessity of providing a separate protocol analyzer, and the serial signals and digital signals or logic signals can be measured and displayed on the same time axis.

According to the present invention, in an information collecting apparatus and information collecting/analyzing system, preferably a logic analyzer device and logic analyzer system, that is connected to and utilizes a host computer and performs signal processing and display using the host computer, digital signals or logic signals sampled and measured in an input unit are transferred to a host computer via a communication interface in substantially real time, and stored in a large capacity storage device provided in the host computer.

Consequently, compared to the prior art, wherein a storage device incorporated within the information collecting apparatus is used, large capacity storage can be easily maintained, and therefore even digital signals or logic signals measured over extremely long periods of time can be reliably measured and saved.

BRIEF DESCRIPTION OF THE DRAWINGS

These and other features, aspects and advantages of the present invention will become better understood with reference to the following description, appended claims and accompanying drawings in which:

DESCRIPTION OF THE PREFERRED EMBODIMENTS

Hereunder, a preferred embodiment of the present invention will be explained in detail with reference to FIG. 1.

The embodiment described below is a preferred specific example of the present invention, therefore although various technically preferred limits have been imposed, the scope of the present invention is not limited thereto unless a statement to the effect that the present invention is so limited is included in the following description.

Figure 1:
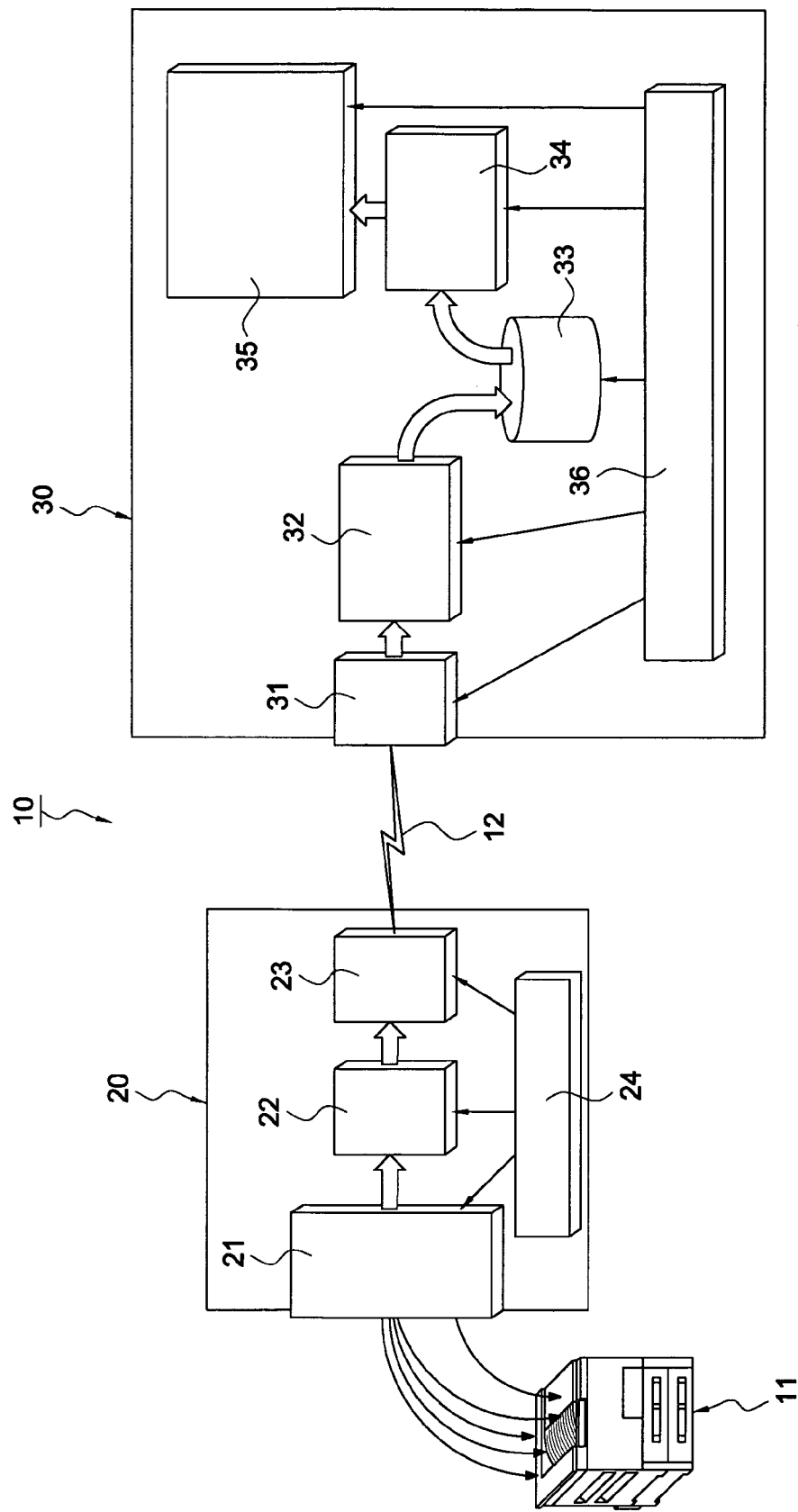
FIG. 1 is an overall block diagram showing the structure of an embodiment of the logic analyzer system according to the present invention.
Figure 2:
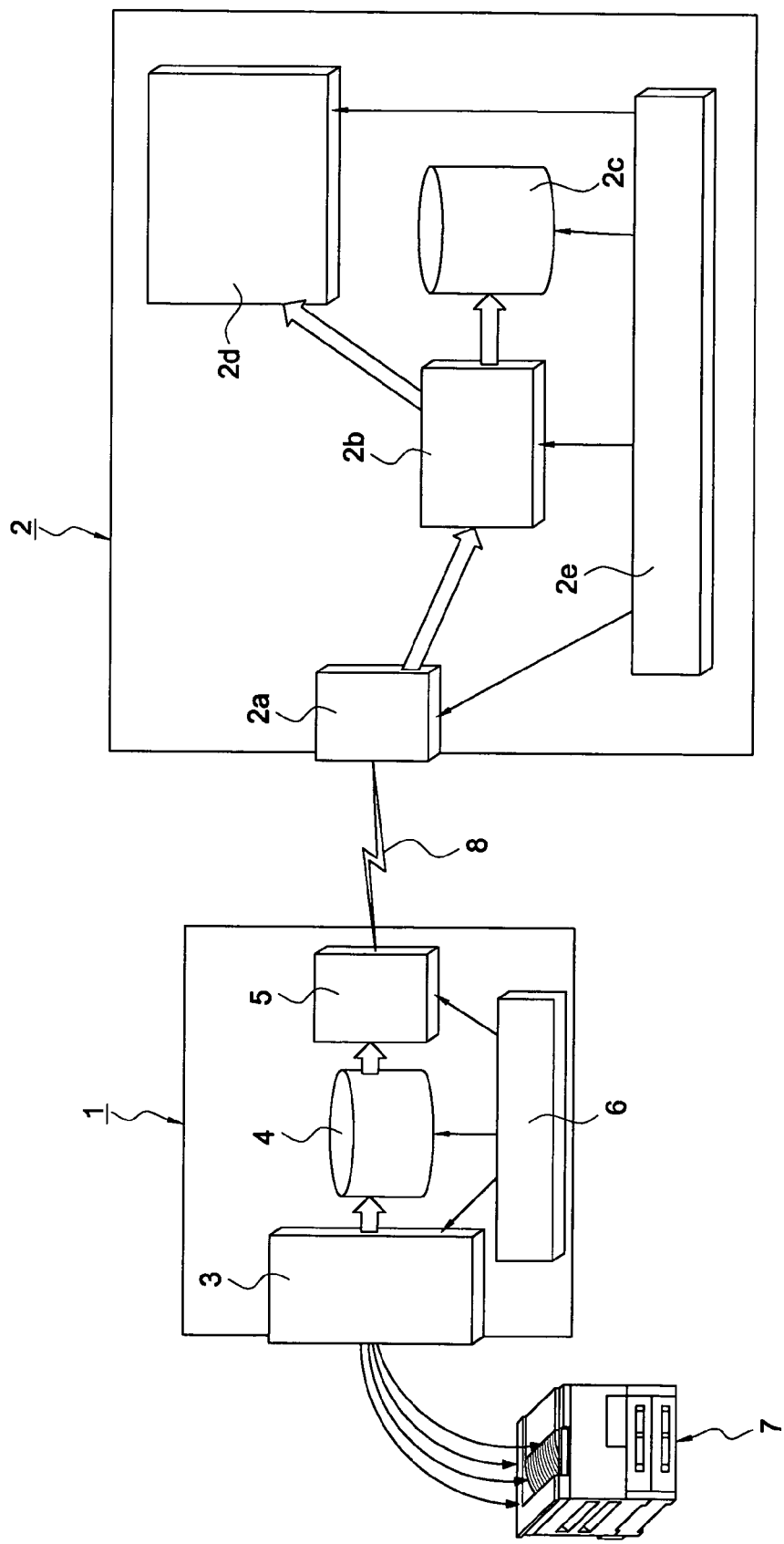
FIG. 2 is an overall block diagram showing the structure of a prior art example of a logic analyzer device utilizing a personal computer.

FIG. 1 is an overall block diagram showing the structure of an embodiment of a logic analyzer system, comprising a logic analyzer device and a personal computer, to which the present invention is applied.

In FIG. 1, the logic analyzer system 10 comprises a logic analyzer device 20 and a personal computer 30.

The logic analyzer device 20 comprises an input unit 21, buffer 22, transfer unit 23, and control unit 24.

The input unit 21 receives logic signals and serial signals acquired by probes (not shown) from each part of an object to be measured 11, which in this case is an electronic machine that is to be measured, and after shaping, such as level conversion or the like, is performed on the logic signals and serial signals, they are sampled at a set sampling frequency, 26-bit digital signals consisting of the 24-bit logic signals and 2-bit serial signals are generated, coded 5-bit run length data for compression and 1-bit error status data are added, and the resulting 32-bit digital signals are output to the buffer 22.

Although the input unit 21 disposes of digital signals that exceed the capacity of the buffer 22 before beginning sampling, it outputs sequentially sampled digital signals to the buffer 22 after sampling is begun based on trigger signals from the control unit 24, described below.

The buffer 22 is formed from a volatile memory, for example, has a capacity in the order of 2 KB for example, and performs primary compression, for example run length compression, and stores the 32-bit digital signals input from the input unit 21.

The transfer unit 23 is connected to the personal computer 30 via, for example, a USB 2.0 or IEEE1394 specification high speed communication interface 12 or the like, roads the 32-bit digital signals stored in real time from the buffer 22, and outputs them to the personal computer 30 via the communication interface 12.

If an error occurs, such as a transfer delay or the like, the period in which it occurs is counted, an error status is established, and these are transmitted as error data. In this case, a 1-bit error status within the 32-bit data is used and the remaining 31 bits are used as the count value of the error time period.

The control unit 24, by controlling the input unit 21, buffer 22, and transfer unit 23, acquires the logic signals and serial signals from the object to be measured 11 at trigger timings that are set based on data transfer instructions from the personal computer 30, stores them in the buffer 22 as primary compressed 32-bit digital signals, sequentially reads the digital signals from the buffer 22 in substantially real time, and sends them from the transfer unit 23 to the personal computer 30 via the communication interface 12.

The personal computer 30 includes a transfer unit 31, signal processing unit 32, storage device 33, display control unit 34, display unit 35, and control unit 36.

The transfer unit 31 receives the digital signals from the transfer unit 23 of the logic analyzer device 20 via the high speed communication interface 12 described above, and outputs them to the signal processing unit 32.

The signal processing unit 32 performs signal processing, i.e. high compression processing, and error processing on the digital signals from the transfer unit 31, then adds an index and stores them in substantially real time in the storage device 33.

The storage device 33 is, for example, a large capacity hard disk drive with a storage capacity of, for example, several tens of gigabytes or more, provided as an auxiliary storage device incorporated in the personal computer 30.

The display control unit 34 outputs the digital signals from the transfer unit 31 to the display unit 35 either directly, or converts them, based on digital signals read from the storage device 33, into various types of display signals, by expanding the read out digital signals and performing signal processing such as appropriate data shaping or the like.

The display unit 35 is a CRT or liquid crystal display unit, for example, and displays images on its screen based on the display signals from the display control unit 34.

The control unit 36 controls the transfer unit 31, signal processing unit 32, storage device 33, display control unit 34, and display unit 35.

The logic analyzer system 10 according to the embodiment of the present invention is constructed and operates as described below.

In the logic analyzer device 20, the control unit 24, when the logic signals and serial signals at each part of the electronic machine which is the object to be measured 11 are input to the input unit 21, reads these logic signals and serial signals by means of the input unit 21, generates 26-bit digital signals and adds 6-bit run length data, and after conversion to 32-bit digital signals, stores them in the buffer 22 in real time in a run length compressed state as primary compression.

At this time, since the control unit 24 does not transfer the digital signals by means of the transfer unit 23 until data transfer instructions are sent from the personal computer, digital signals stored in the buffer 22 that exceed the storage capacity of the buffer 22 are discarded.

When a data transfer instruction is sent from the personal computer, the control unit 24 of the logic analyzer device 20 beings sampling with the data transfer instruction as a trigger, sequentially reads the digital signal from the buffer 22 by means of the transfer unit 23, and transfers it to the host computer 30 via the communication interface 12 in real time.

If for some reason a transfer error occurs at this time, the control unit 24 of the logic analyzer device 20 stores data to the effect that an error has occurred together with a counted error occurrence time as 32-bit error data in place of the digital signal, and when the transfer time occurs, transfers the error data by means of the transfer unit 23 to the host computer 30 via the communication interface 12.

The personal computer 30 thereby receives the digital signal transferred from the logic analyzer device 20 by means of the transfer unit 31, and performs signal processing by means of the signal processing unit 32. Specifically, the signal processing unit 32 performs data storage processing as data shaping, namely further compressing the digital signal from the transfer unit 31 at a high compression rate and, when there is error data, similarly compressing this error data, adding an index and storing it in the storage device 33.

The signal processing unit 32, when necessary, can expand the primary compression of the digital signal from the transfer unit 31, output it to the display control unit 34, and display it in real time on the display unit 35.

Further, the personal computer 30 sequentially reads out and expands the digital signals stored in the storage device 33 by means of the display control unit 34 and, based on the retrieved digital signal, i.e. logic and serial signals, performs various types of display control processing, outputs the generated various types of display signals to the display unit 35, and displays various types of images on the display unit 35.

The display control unit 34, if the data read from the storage device 33 at this time contains error data, performs error processing based on the error data, detects the time period of the error occurrence, and corrects the time axes of subsequent digital signals to that time period only.

Since the display control unit 34 thereby retrieves the logic and serial signals in a synchronized state, they can be displayed on the same time axis on the screen of the display unit 35.

Also, the display control unit 34, based on the serial signal read from the storage device 33, can perform translation based on settings specified by the serial signal, e.g. baud rate, bit length, and the like, and display commands allocated to code data set by the object to be measured 11 on the screen of the display unit 35.

In this way, according to the present invention, digital signals are transferred to the personal computer 30 via the high speed communication interface 12 without being temporarily saved in a storage device on the logic analyzer device 20 side. Then, using the large capacity storage device 33 of, for example, several tens of gigabytes or more provided in the personal computer 30, the digital signals arc stored in substantially real time, whereby logic signals and serial signals read from the object to be measured 11 can be measured over extremely long periods of time and stored in the storage device 33 without being limited by the storage capacity of the storage device 33.

Further, because serial signals can be read and measured at the same time in synchronization with logic signals, the logic signals and serial signals can be synchronized and measured by means of the logic analyzer device 20 only, without providing a separate protocol analyzer.

In the above embodiment, although the logic analyzer device 20 is connected to the personal computer 30 via a communication interface 12, where the communication interface 12 includes a power line, power can be supplied to the logic analyzer device 20 from the personal computer 30 via the communication interface 12, and by combining the logic analyzer device 20 with a notebook type personal computer, it can be used in any location.

Also, although the above embodiment has been described with a personal computer 30 used as the host computer, it is not limited to this, and another type of host computer can be used.

Further, although a 24-channel logic signal is input to the logic analyzer device 20 in the above embodiment, it is not limited to this, and a 23-channel or less, or 25-channel or more logic signal can also be input.

Also, although a 2-channel serial signal is input to the logic analyzer device 20 in the above embodiment, it is not limited to this, and a 1-channel or less, or 3-channel or more serial signal can also be input.

Further still, although a serial signal is also input to the input unit 21 of the logic analyzer device 20 from the object to be measured 11 in the above embodiment, it is not limited to this, and a logic signal only can also be input in similar fashion to a logic analyzer device of the prior art.

In addition, although a logic analyzer device 20 is used as the information collecting apparatus in the above embodiment, it is not limited to this, and another type of information collecting apparatus for reading digital signals from each part of the object to be measured 11 can clearly be used.

As described above, according to the present invention, in an information collecting apparatus and information collecting/analyzing system, preferably a logic analyzer device and logic analyzer system, that is connected to and utilizes a host computer and performs signal processing and display using the host computer, digital signals or logic signals sampled and measured in an input unit are transferred to a host computer via a communication interface in substantially real time, and stored in a large capacity storage device provided in the host computer.

Consequently, compared to the prior art wherein a storage device incorporated within the information collecting apparatus is used, large capacity storage can be easily maintained, and therefore even digital signals or logic signals measured over extremely long periods of time can be reliably measured and saved.

In this way, according to the present invention, by using an external host computer, a logic analyzer device and logic analyzer system can measure over long periods of time and, in addition to logic signals, can measure serial signals from the object to be measured, matched to the time axis and standard time of the logic signals, without a built-in large capacity storage device.

While illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. An information collecting apparatus, comprising: an input unit for inputting digital signals from each part of an object to be measured, for sampling the digital signals; a transfer unit for transferring digital signals from the input unit via a communication interface to a host computer which performs signal processing of the digital signals on a serial bus without initial storage of the digital signals in a high capacity memory, the host computer storing the processed digital signals in a storage device and displaying various images based on corresponding digital signals after the digital signals have been processed; and a control unit for controlling the input unit and transfer unit, wherein the transfer unit transfers digital signals from the input unit in substantially real time.

2. The information collecting apparatus according to claim 1, wherein
the information collecting apparatus is a logic analyzer device, with logic signals from each part of an object to be measured being input to the input unit, and wherein
the transfer unit transfers logic signals from the input unit via the communication interface or via a peripheral interface to the host computer.

3. The information collecting apparatus according to claim 1, further comprising:
a buffer for compressing and temporarily storing digital signals or logic signals from the input unit.

4. The information collecting apparatus according to claim 1, wherein
the control unit initiates transfer of digital signals or logic signals by means of the transfer unit, based on a transfer instruction from the host computer.

5. The information collecting apparatus according to claim 1, wherein
the communication interface is a high speed interface.

6. The information collecting apparatus according to claim 1, wherein
power is supplied to the information collecting apparatus from the host computer via a power supply line of the computer interface.

7. The information collecting apparatus according to claim 1, wherein
when an error occurs in the input unit or in the transfer unit, the control unit allows the transfer unit to output an error occurrence and time as error data to the host computer.

8. The information collecting apparatus according to claim 1, wherein
the input unit input serial signals from each part of an object to be measured, the input unit synchronizing the serial signals with digital signals or logic signals, for outputting, and wherein
transfer unit transfers the serial signals to the host computer together with the digital signals or logic signals.

9. The information collecting/analyzing system, comprising: an information collecting apparatus, including an input unit for inputting digital signals from each part of an object to be measured, for sampling the digital signals, a transfer unit for transferring digital signals form the input unit via a communication interface to a host computer, and a control unit for controlling the input unit and the transfer unit; and a host computer, including a signal processing unit for processing digital signals transferred from the information collecting apparatus, a storage device for storing digital signals from the signal processing unit, a display unit for displaying various types of images based on the digital signals processed by the signal processing unit or on the digital signals stored in the storage device, and a control unit for controlling the signal processing unit, storage device and display unit, wherein the transfer unit of the information collecting apparatus transfers digital signals from the input unit on a serial bus in substantially real time to the host computer without initial storage of the digital signals in a high capacity memory prior to processing, and wherein the storage device of the host computer stores logic signals transferred from the information collecting apparatus in substantially real time after processing of the signals.

10. The information collecting apparatus according to claim 9, wherein
the information collecting apparatus is a logic analyzer device, with logic signals from each part of an object to be measured being input to the input unit of the information collecting apparatus, and wherein
the transfer unit of the information collecting apparatus transfers logic signals from the input unit via the communication interface to the host computer.

11. The information collecting apparatus according to claim 9, wherein
the information collecting apparatus further comprises a buffer for primarily compressing and temporarily storing digital signals or logic signals from the input unit, and wherein
the signal processing unit of the host computer compresses the processed digital signals and stores them in the storage device.

12. The information collecting apparatus according to claim 9, wherein
the control unit of the information collecting apparatus initiates transfer of digital signals or logic signals by means of the transfer unit, based on a transfer instruction from the control unit of the host computer.

13. The information collecting apparatus according to claim 9, wherein
the communication interface is a high speed interface.

14. The information collecting apparatus according to claim 9, wherein
power is supplied to the information collecting apparatus from the host computer via a power supply line of the communication interface.

15. The information collecting apparatus according to claim 9, wherein
when an error occurs in the input unit or in the transfer unit, the control unit of the information collecting apparatus allows the transfer unit to output an error occurrence and time as error data to the host computer.

16. The information collecting apparatus according to claim 9, wherein
the input unit of the information collecting apparatus inputs serial signals from each part of an object to be measured, the input unit synchronizing the serial signals with the digital signals or logic signals, for output, wherein
the transfer unit transfers the serial signals to the host computer together with the digital signals or logic signals, and wherein
the signal processing unit of the host computer processes the digital signals or logic signals and the serial signals, for storing them in the storage device.

* * * * *